(12) United States Patent
Yamamoto et al.

(10) Patent No.: US 6,914,639 B2
(45) Date of Patent: Jul. 5, 2005

(54) COMBINATION TUNER CAPABLE OF RECEIVING TELEVISION SIGNAL AND FM SIGNAL

(75) Inventors: Masaki Yamamoto, Fukushima-ken (JP); Takao Sasaki, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 536 days.

(21) Appl. No.: 10/043,956

(22) Filed: Jan. 9, 2002

(65) Prior Publication Data

US 2002/0089609 A1 Jul. 11, 2002

(30) Foreign Application Priority Data

Jan. 11, 2001 (JP) ........................................ 2001-003773

(51) Int. Cl.[7] .............................. H40N 5/50; H40N 5/46
(52) U.S. Cl. ........................ 348/731; 348/725; 348/729; 348/736
(58) Field of Search .................................. 348/731, 725, 348/729, 732, 736, 733, 505, 512; 455/196.1, 255, 260; H04N 5/46, 5/50

(56) References Cited

U.S. PATENT DOCUMENTS 6,108,050 A * 8/2000 Yamamoto et al. ......... 348/731
6,243,567 B1 * 6/2001 Saito ........................ 455/188.2
6,344,881 B1 * 2/2002 Endo ........................... 348/729
6,483,552 B1 * 11/2002 Yamamoto ................... 348/729
6,683,656 B1 * 1/2004 Kikuchi ....................... 348/729

FOREIGN PATENT DOCUMENTS

| JP | 2000-78490 | 3/2000 |
|----|------------|--------|
| JP | 2000-217051 | 8/2000 |

* cited by examiner

*Primary Examiner*—John Miller
*Assistant Examiner*—Trang U. Tran
(74) *Attorney, Agent, or Firm*—Brinks Hofer Gilson & Lione (57) ABSTRACT

A combination tuner includes a switching circuit having three transistors which are selectively turned on and off so that one of a television signal received by a first signal receiving unit using an external antenna that is a high sensitivity antenna, an FM signal received by a second signal receiving unit using an internal antenna that is a low sensitivity antenna, and an FM signal received by the first signal receiving unit using the external antenna is selected according to three-mode band data. Therefore, the combination tuner can select an antenna for receiving a desirable FM signal according to the reception field intensity of the target FM signal so that the FM signal can always be reproduced successfully.

4 Claims, 3 Drawing Sheets

COMBINATION TUNER CAPABLE OF RECEIVING TELEVISION SIGNAL AND FM SIGNAL

This application claims the benefit of priority to Japanese Patent Application 2001-003773, filed on Jan. 11, 2001.

BACKGROUND OF THE INVENTION

1. Field of the Invention

The present invention relates to a combination tuner capable of selectively receiving a television signal and an FM signal. More specifically, the present invention relates to a combination tuner capable of receiving a desired FM signal according to the reception level when an FM signal is received.

2. Description of the Related Art

Typically, a combination tuner is a tuner capable of selectively receiving a television signal and an FM signal, and is used in connection with a television antenna for receiving a television signal and an FM antenna for receiving an FM signal.

Figure 3:
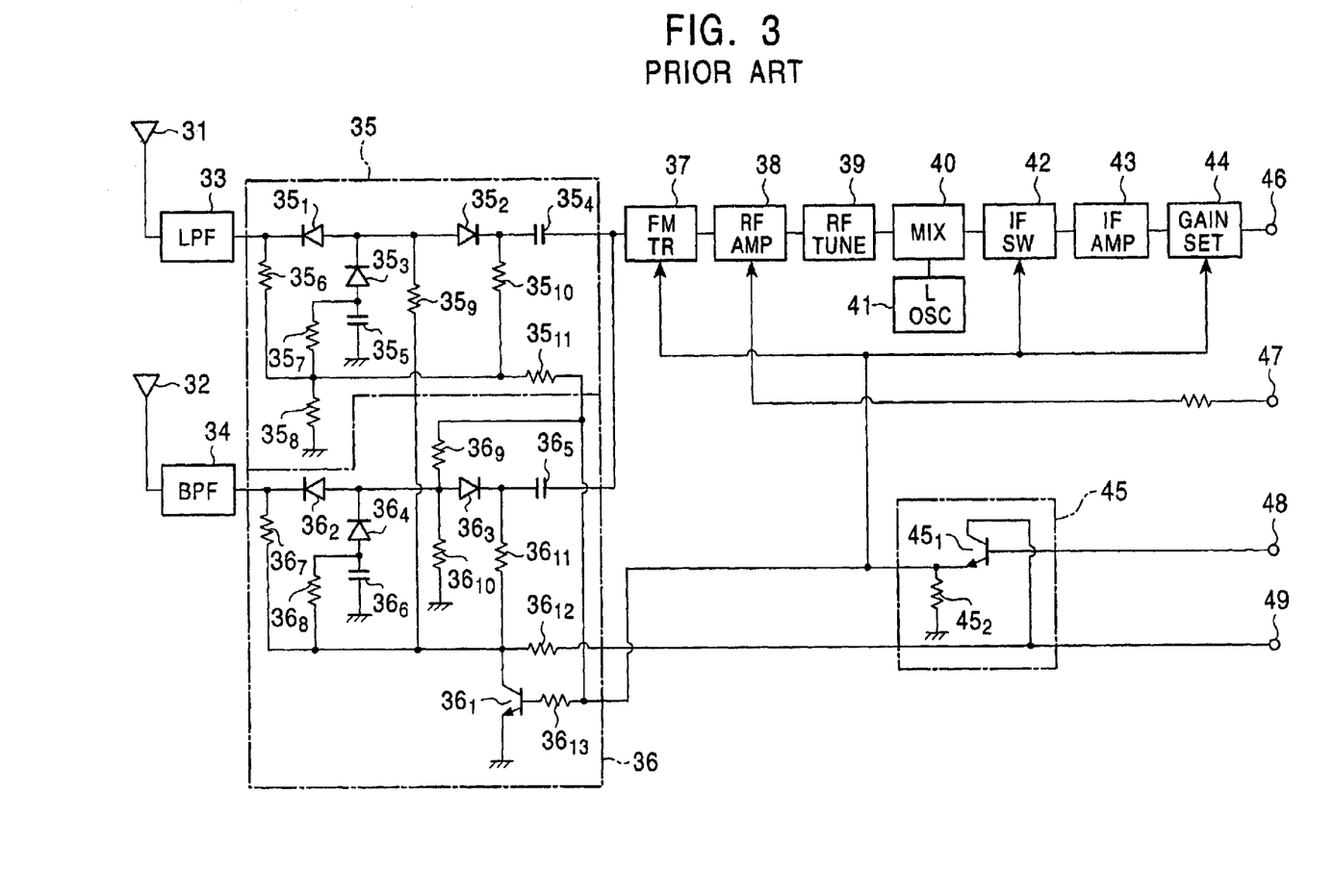
FIG. 3 is a circuit diagram of an exemplary known combination tuner, partially showing the main components in blocks.

FIG. 3 is a circuit diagram of an exemplary known combination tuner, partially showing the main components in blocks.

As shown in FIG. 3, the combination tuner includes an external antenna 31, an internal antenna 32, a low-pass filter (LPF) 33, a band-pass filter (BPF) 34, a television signal selection stage 35, an FM signal selection stage 36, an FM trap (FM TR) 37, a radio-frequency amplifier stage (RF AMP) 38, a radio-frequency tuner stage 39, a frequency mixer stage (MIX) 40, a local oscillator (L OSC) 41, an intermediate-frequency bandwidth switching stage (IF SW) 42, an intermediate-frequency amplifier stage (IF AMP) 43, a gain setting stage 44, a switching circuit 45, an intermediate-frequency signal output terminal 46, an automatic gain control (AGC) voltage supply terminal 47, a band data supply terminal 48, and a power supply terminal 49. The external antenna 31 is a high sensitivity antenna, and is connected to the combination tuner through a connector (not shown). The internal antenna 32 is a low sensitivity antenna, and is connected to the combination tuner through a pin diode (not shown). Other circuit components are connected in such a way as shown in FIG. 3.

The television signal selection stage 35 includes three diodes $35_1$, $35_2$, and $35_3$, two capacitors $35_4$ and $35_5$, and six resistors $35_6$, $35_7$, $35_8$, $35_9$, $35_{10}$, and $35_{11}$. These circuit components are connected in such a way as shown in FIG. 3. The FM signal selection stage 36 includes one transistor $36_1$, three diodes $36_2$, $36_3$, and $36_4$, two capacitors $36_5$ and $36_6$, and seven resistors $36_7$, $36_8$, $36_9$, $36_{10}$, $36_{11}$, $36_{12}$, and $36_{13}$. These circuit components are connected in such a way as shown in FIG. 3. The switching circuit 45 includes one transistor $45_1$ and one resistor $45_2$, and these circuit components are connected in such a way as shown in FIG. 3.

The operation of the thus constructed combination tuner is now described.

A television signal received by the external antenna 31 is fed to the input of the television signal selection stage 35 after an unwanted component has been removed by the low-pass filter 33. Likewise, an FM signal received by the internal antenna 32 is fed to the input of the FM signal selection stage 36 after an unwanted component is removed by the band-pass filter 34. If the combination tuner selects to output the television signal, a ground voltage data signal is supplied to the band data supply terminal 48 from an external controller (not shown). If the combination tuner selects to output the FM signal, on the other hand, a power supply voltage data signal is supplied to the band data supply terminal 48 from the external controller.

For selection and output of the television signal, the ground voltage data signal supplied to the band data supply terminal 48 is delivered to the switching circuit 45 to turn off the transistor $45_1$ of emitter-follower connected type so that the output of the switching circuit 45 becomes a ground voltage. The ground voltage output from the switching circuit 45 is applied to the FM signal selection stage 36, and is also applied to the control inputs of the FM trap 37, the intermediate frequency bandwidth switching stage 42, and the gain setting stage 44.

Once the FM signal selection stage 36 has received the ground voltage, the base of the transistor $36_1$ becomes a ground voltage, and the transistor $36_1$ is turned off. Since the transistor $36_1$ is turned off, the diodes $36_2$ and $36_3$ whose cathode and anode are supplied with a positive voltage and a ground voltage, respectively, are reverse biased. The diodes $36_2$ and $36_3$ are then turned off. Therefore, the FM signal supplied to the input of the FM signal selection stage 36 is blocked by the diodes $36_2$ and $36_3$ which are turned off, and is not transmitted to the output.

In the television signal selection stage 35, since the transistor $36_1$ is turned off, the diodes $35_1$ and $35_2$ whose anode and cathode are supplied with a positive voltage and a ground voltage, respectively, are forward biased, while the diode $35_3$ whose anode and cathode are supplied with a ground voltage and a positive voltage, respectively, is reverse biased. Then, the diodes $35_1$ and $35_2$ are turned on, while the diode $35_3$ is turned off. The television signal supplied to the input of the television signal selection stage 35 is therefore transmitted to the output via the diodes $35_1$ and $35_2$ which are turned on, followed by the FM trap 37.

Upon receipt of the ground voltage at the control input, the FM trap 37 activates an FM trap for trapping an FM frequency band signal to remove the FM signal component contained in the television signal. Upon receipt of the ground voltage at the control input, the intermediate frequency bandwidth switching stage 42 switches the intermediate frequency band to 6 MHz which is the intermediate frequency bandwidth of the television signal. Upon receipt of the ground voltage at the control input, the gain setting stage 44 sets a large signal gain for the gain setting stage 44.

The television signal output from the television signal selection stage 35, in which the FM signal component has been removed by the FM trap 37, is amplified to a predetermined level by the radio-frequency amplifier stage 38. The resulting television signal is passed to the radio-frequency tuner stage 39, where a required channel signal is selected, and is then mixed with the local oscillation signal output from the local oscillator 41 by the frequency mixer stage 40 for conversion into an intermediate frequency signal. In the mixed output from the frequency mixer stage 40, an intermediate frequency signal of 6 MHz is selected by the intermediate frequency bandwidth switching stage 42, and the resulting intermediate frequency signal is amplified to a predetermined level by the intermediate frequency amplifier stage 43. The signal is further amplified at a large signal gain by the gain setting stage 44, and is forwarded to the intermediate frequency signal output terminal 46.

For selection and output of the television signal, an automatic gain control voltage corresponding to the reception level of the television signal is further applied to the automatic gain control voltage supply terminal 47. The gain of the radio-frequency amplifier stage 38 is automatically controlled according to the automatic gain control voltage.

For selection and output of the FM signal, the power supply voltage data signal supplied to the band data supply terminal 48 is fed to the switching circuit 45 to turn on the transistor $45_1$ of emitter-follower connected type so that the output of the switching circuit 45 becomes a power supply voltage. The power supply voltage output from the switching circuit 45 is applied to the FM signal selection stage 36, and is also applied to the control inputs of the FM trap 37, the intermediate frequency bandwidth switching stage 42, and the gain setting stage 44, as in selection and output of the television signal.

Once the FM signal selection stage 36 has received a power supply voltage, the base of the transistor $36_1$ becomes a power supply voltage, and the transistor $36_1$ is turned on. Since the transistor $36_1$ is turned on, the diodes $36_2$ and $36_3$ whose cathode and anode are supplied with a ground voltage and a positive voltage, respectively, are forward biased. Then, the diodes $36_2$ and $36_3$ are turned on. At the same time, the diode $36_4$ whose cathode and anode are supplied with positive voltage and ground voltage, respectively, is reverse biased. Therefore, the FM signal supplied to the input of the FM signal selection stage 36 is transmitted to the output via the diodes $36_2$ and $36_3$ which are turned on, followed by the FM trap 37.

In the television signal selection stage 35, since the transistor $36_1$ is turned on, the diodes $35_1$ and $35_2$ whose anode and cathode are supplied with a ground voltage and a positive voltage, respectively, are reverse biased. Then, the diodes $35_1$ and $35_2$ are turned off. Therefore, the television signal supplied to the input of the television signal selection stage 35 is blocked by the diodes $35_1$ and $35_2$ which are turned off, and is not transmitted to the output.

Upon receipt of the power supply voltage at the control input, the FM trap 37 deactivates an FM trap for trapping an FM frequency band signal. Upon receipt of the power supply voltage at the control input, the intermediate frequency bandwidth switching stage 42 switches the intermediate frequency band to 1.2 MHz which is the intermediate frequency band of the FM signal. Upon receipt of the power supply voltage at the control input, the gain setting stage 44 sets a small signal gain for the gain setting stage 44.

For selection and output of the FM signal, the maximum gain set voltage is further applied to the automatic gain control voltage supply terminal 47 so that the gain of the radio-frequency amplifier stage 38 is controlled so as to be maximized.

The FM signal output from the FM signal selection stage 36 is not trapped by the FM trap 37, and is amplified to a predetermined level by the radio-frequency amplifier stage 38. The resulting FM signal is passed to the radio-frequency tuner stage 39, where a required frequency signal is selected, and is then mixed with the local oscillation signal output from the local oscillator 41 by the frequency mixer stage 40 for conversion into an intermediate frequency signal. In the mixed output from the frequency mixer stage 40, an intermediate frequency signal of 1.2 MHz is selected by the intermediate frequency bandwidth switching stage 42, and the resulting intermediate frequency signal is amplified to a predetermined level by the intermediate frequency amplifier stage 43. The signal is further amplified at a small signal gain by the gain setting stage 44, and is forwarded to the intermediate frequency signal output terminal 46.

As described above, the known combination tuner supplies a ground voltage data signal or a power supply voltage data signal to the band data supply terminal 48, allowing a received television signal or a received FM signal to be selected and output.

As such, the known combination tuner can select and output a received television signal or a received FM signal by changing the voltage polarity of the data signal supplied to the band data supply terminal 48. Since the known combination tuner receives an FM signal using the internal antenna 32 which is a low sensitivity antenna, the level of the received FM signal may be significantly lowered depending upon the field intensity of the FM signal received by the internal antenna 32. If an FM signal is selected and output while the level of the received FM signal is greatly lowered, the selected FM signal may not be reproduced successfully.

SUMMARY OF THE INVENTION

Accordingly, in view of such a technical background, it is an object of the present invention to provide a combination tuner which selects an antenna for receiving an FM signal according to the field intensity of the target FM signal to always reproduce the FM signal successfully.

To this end, in one aspect of the present invention, a combination tuner includes a first signal receiving unit for receiving a television signal and an FM signal using an external antenna, a second signal receiving unit for receiving an FM signal using an internal antenna, a signal selecting unit for selecting reception signals of the first signal receiving unit and a reception signal of the second signal receiving unit, a radio-frequency selecting and amplifying unit for selecting and amplifying the resulting reception signal, a frequency converting unit for converting the amplified radio-frequency signal into an intermediate frequency signal, an intermediate frequency selecting and amplifying unit for selecting and amplifying the intermediate frequency signal, and a switching circuit for switching selection of the television signal or the FM signal according to three-mode band data. The switching circuit includes three transistors which are selectively turned on and off so that one of the television signal from the first signal receiving unit, the FM signal from the second signal receiving unit, and the FM signal from the first signal receiving unit is selected according to the mode of the band data.

Accordingly, the switching circuit,includes three transistors which are selectively turned on and off so that one of the television signal from the first signal receiving unit which is received using an external antenna, the FM signal from the second signal receiving unit which is received using an internal antenna, and the FM signal from the first signal receiving unit which is received using the external antenna can be selected according to three modes of the band data. Therefore, if the target FM signal has a low field intensity, the external antenna which is a high sensitivity antenna can be used to receive the FM signal. This prevents the level of the received FM signal from being extremely lowered, and the FM signal can be always reproduced successfully.

Preferably, the switching circuit includes a first transistor whose base is supplied with the band data, a second transistor whose base is supplied with the band data, and a third transistor whose base and emitter are supplied with the output of the first transistor and the output of the second transistor, respectively. Both of the first and second transistors are emitter-follower connected type ones. Therefore, the switching circuit can be relatively simplified.

In another aspect of the present invention, a combination tuner includes a first signal receiving unit for receiving a television signal and an FM signal using an external antenna, a second signal receiving unit for receiving an FM signal using an internal antenna, a signal selecting unit for selecting reception signals of the first signal receiving unit and a reception signal of the second signal receiving unit, a radio-frequency selecting and amplifying unit for selecting and amplifying the resulting reception signal, a frequency converting unit for converting the amplified radio-frequency signal into an intermediate frequency signal, an intermediate frequency selecting and amplifying unit for selecting and amplifying the intermediate frequency signal, and a switching circuit for switching selection of the television signal or the FM signal according to three-mode band data. The switching circuit includes three transistors which are selectively turned on and off so that one of the television signal from the first signal receiving unit, the FM signal from the second signal receiving unit, and the FM signal from the first signal receiving unit is selected according to the mode of the band data, and so that an automatic gain control voltage which is supplied to the radio-frequency selecting and amplifying unit is attenuated when the FM signal from the second signal receiving unit is selected.

Accordingly, the switching circuit includes three transistors which are selectively turned on and off so that one of the television signal from the first signal receiving unit which is received using an external antenna, the FM signal from the second signal receiving unit which is received using an internal antenna, and the FM signal from the first signal receiving unit which is received using the external antenna can be selected according to three modes of the band data, and so that an automatic gain control voltage which is supplied to the radio-frequency selecting and amplifying unit is attenuated when the FM signal from the second signal receiving unit which is received using the internal antenna is selected so that the gain of the radio-frequency selecting and amplifying unit may be slightly lowered. Therefore, if the target FM signal has a low field intensity, the external antenna which is a high sensitivity antenna can be used to receive the FM signal. This prevents the level of the received FM signal from being extremely lowered, and the FM signal can be always reproduced successfully.

Preferably, the switching circuit includes a first transistor whose base is supplied with the band data, a second common-emitter transistor whose base is supplied with the band data and whose collector is supplied with the automatic gain control voltage via a resistor divider, and a third transistor whose base is supplied with a divided voltage of the automatic gain control voltage and whose emitter is supplied with the output of the first transistor. The first transistor is emitter-follower connected type one. Therefore, the switching circuit can be relatively simplified.

BRIEF DESCRIPTION OF THE DRAWINGS

For more complete understanding of the present invention, a reference is made to the following detailed description of the invention taken in conjunction with the accompanying drawings in which.

DESCRIPTION OF THE PREFERRED EMBODIMENTS

Figure 1:
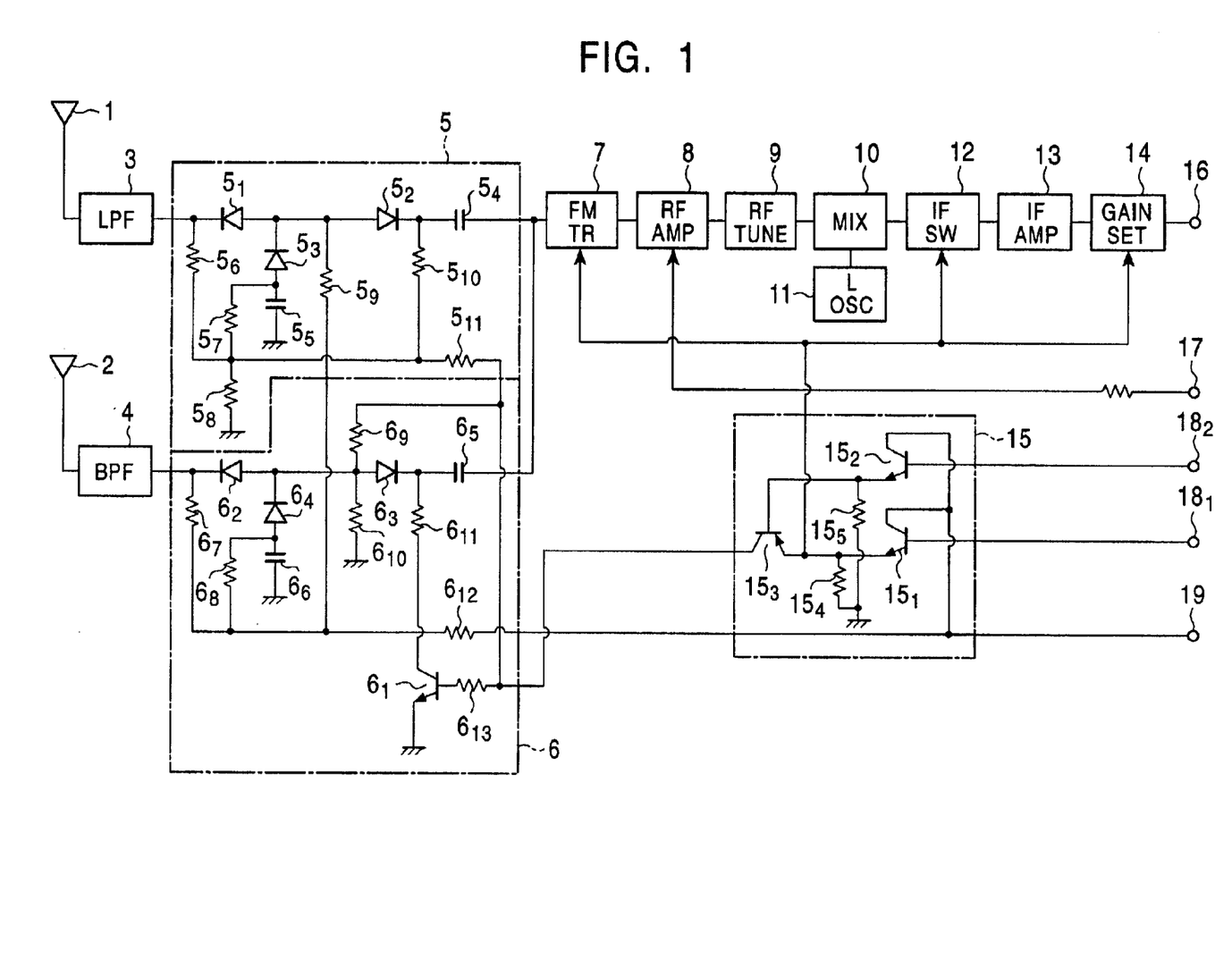
FIG. 1 is a circuit diagram of a combination tuner according to a first embodiment of the present invention, partially showing the main components in blocks.

FIG. 1 is a circuit diagram of a combination tuner according to a first embodiment of the present invention, partially showing the main components in blocks.

Referring to FIG. 1, the combination tuner includes an external antenna 1, an internal antenna 2, a low-pass filter (LPF) 3, a band-pass filter (BPF) 4, a first signal selections stage 5, a second signal selection stage 6, an FM trap (FM TR) 7, a radio-frequency amplifier stage (RF AMP) 8, a radio-frequency tuner stage 9, a frequency mixer stage (MIX) 10, a local oscillator (L OSC) 11, an intermediate frequency bandwidth switching stage (IF SW) 12, an intermediate frequency amplifier stage (IF AMP) 13, a gain setting stage 14, a switching circuit 15, an intermediate frequency signal output terminal 16, an automatic gain control (AGC) voltage supply terminal 17, a pair of band data supply terminals $18_1$ and $182_2$, and a power supply terminal 19.

The first signal selection stage 5 has the same structure as that of the television signal selection stage 35 shown in FIG. 3, including three diodes $5_1$, $5_2$, and $5_3$, two capacitors $5_4$ and $5_5$, and six resistors $5_6$, $5_7$, $5_8$, $5_9$, $5_{10}$, and $5_{11}$. These circuit components are connected in such a way as shown in FIG. 1. The second signal selection stage 6 has the same structure as that of the FM signal selection stage 6 shown in FIG. 3, including one transistor $6_1$, three diodes $6_2$, $6_3$, and $6_4$, two capacitors $6_5$ and $6_6$, and seven resistors $6_7$, $6_8$, $6_9$, $6_{10}$, $6_{11}$, $6_{12}$, and $6_{13}$. These circuit components are connected in such a way as shown in FIG. 1.

On the contrary, the switching circuit 15 has a different structure from that of the switching circuit 45 shown in FIG. 3, including three transistors $15_1$, $15_2$, and $15_3$, and two resistors $15_4$ and $15_5$. These circuit components are connected in such a way as shown in FIG. 1.

The band data which is used to set operation mode of the combination tuner at any one of the following three modes: a television mode using the external antenna 1 (first mode); an FM mode using the internal antenna 2 (second mode); and an FM mode using the external antenna 1 (third mode) is supplied to the pair of band data supply terminals $18_1$ and $18_2$ from an external controller (not shown). In the first mode, code 0 equivalent to a ground voltage is applied to the terminal $18_1$, and code 0 indicating the ground voltage is applied to the terminal $18_2$. In the second mode, code 0 indicating the ground voltage is applied to the terminal $18_1$, and code 1 equivalent to a power supply voltage is applied to the terminal $18_2$. In the third mode, code 1 indicating the power supply voltage is applied to the terminal $18_1$, and code 1 indicating the power supply voltage is applied to the terminal $18_2$.

The external antenna 1 is a high sensitivity antenna, and is connected to the combination tuner through a connector (not shown). The internal antenna 2 is a low sensitivity antenna, and is connected to the combination tuner through a pin diode (not shown). The low-pass filter 3 has the input connected to the external antenna 1, and the output connected to the input of the first signal selection stage 5. The band-pass filter 4 has the input connected to the internal antenna 2, and the output connected to the input of the second signal selection stage 6. The FM trap 7 has the input connected to the outputs of the first and second signal selection stages 5 and 6, and the output connected to the input of the radio-frequency amplifier stage 8. The output of the radio-frequency amplifier stage 8 is connected to the input of the radio-frequency tuner stage 9. The frequency mixer stage 10 has a first input connected to the output of the radio-frequency tuner stage 9, a second input connected to the output of the local oscillator 11, and the output connected to the input of the intermediate frequency bandwidth switching stage 12. The intermediate frequency amplifier stage 13 has the input connected to the output of the intermediate frequency bandwidth switching stage 12, and the output connected to the input of the gain setting stage 14. The output of the gain setting stage 14 is connected to the intermediate frequency signal output terminal 16. The input of the switching circuit 15 is connected to the band data supply terminals $18_1$ and $18_2$, and the output of the switching circuit 15 is connected to the control input of the second signal selection stage 6, the control input of the FM trap 7, the control input of the intermediate frequency bandwidth switching stage 12, and the control input of the gain setting stage 14. The automatic gain control voltage supply terminal 17 is connected to the control input of the radio-frequency amplifier stage 8 via a buffer resistor (not numbered).

The operation of the thus constructed combination tuner according to the first embodiment is now described.

The external antenna 1 receives a television signal and an FM signal. The received television signal and FM signal, in which an unwanted component has been removed by the low-pass filter 3, are delivered to the input of the first signal selection stage 5. The internal antenna 2 receives an FM signal. The received FM signal, in which an unwanted component has been removed by the band-pass filter 4, is delivered to the input of the second signal selection stage 6.

For selection and output of the television signal, the codes in the first mode are applied to the pair of band data supply terminals $18_1$ and $18_2$, namely, code 0 and code 0 are applied to the terminals $18_1$ and $18_2$, respectively. The two codes 0 and 0 are then forwarded to the switching circuit 15. When the switching circuit 15 receives the two codes 0 and 0, the transistor $15_1$ of emitter-follower connected type and the transistor $15_2$ of emitter-follower connected type are simultaneously turned off, and the transistor $15_3$ is also turned off. Then, both outputs of the switching circuit 15 become ground voltages. The ground voltages output from the switching circuit 15 are applied to the second signal selection stage 6, and to the control inputs of the FM trap 7, the intermediate frequency bandwidth switching stage 12, and the gain setting stage 14.

Once the second signal selection stage 6 has received the ground voltage, the transistor $6_1$ is turned off. Since the transistor $6_1$ is turned off, the diodes $6_2$ and $6_3$, whose cathode and anode are supplied with a positive voltage and a ground voltage, respectively, are reverse biased. Then, the diodes $6_2$ and $6_3$ are turned off. Therefore, the FM signal supplied to the input of the second signal selection stage 6 is blocked by the diodes $6_2$ and $6_3$ which are turned off, and is not transmitted to the output.

In the first signal selection stage 5, since the transistor $6_1$ is turned off, the diodes $5_1$ and $5_2$, whose anode and cathode are supplied with a positive voltage and a ground voltage, respectively, are forward biased. At the same time, the diode $5_3$, whose anode and cathode are supplied with a ground voltage and a positive voltage, respectively, is reverse biased. Then, the diodes $5_1$ and $5_2$ are turned on, and the diode $5_3$ is turned off. Therefore, the television signal and the FM signal which are passed to the input of the first signal selection stage 5 are transmitted to the output via the diodes $5_1$ and $5_2$ which are turned on, followed by the FM trap 7.

Upon receipt of the ground voltage at the control input, the FM trap 7 activates an FM trap for trapping an FM frequency band signal to remove an FM signal component contained in the television signal and the FM signal which are supplied from the first signal selection stage 5. Upon receipt of the ground voltage at the control input, the intermediate frequency band switching stage 12 switches the intermediate frequency band to 6 MHz which is the intermediate frequency band of the television signal. Upon receipt of the ground voltage at the control input, the gain setting stage 14 sets a large signal gain for the gain setting stage 14.

In the television signal and FM signal which are output from the first signal selection stage 5, the FM signal component is removed by the FM trap 7, and the television signal is only extracted. The extracted television signal is amplified to a predetermined level by the radio-frequency amplifier stage 8. The resulting television signal is passed to the radio-frequency tuner stage 9, where a required channel signal is selected, and is then mixed with the local oscillation signal output from the local oscillator 11 by the frequency mixer stage 10 for conversion into an intermediate frequency signal. In the mixed output from the frequency mixer stage 10, an intermediate frequency signal of 6 MHz is selected by the intermediate frequency switching stage 12, and the resulting intermediate frequency signal is amplified to a predetermined level by the intermediate frequency amplifier stage 13. The signal is further amplified at a large signal gain by the gain setting stage 14, and is forwarded to the intermediate frequency signal output terminal 16.

For selection and output of the television signal, an automatic gain control voltage corresponding to the reception level of the television signal, e.g., an automatic gain control voltage ranging from 4.0 to 0.5 V, is applied to the automatic gain control voltage supply terminal 17. In response to the applied automatic gain control voltage, the gain of the radio-frequency amplifier stage 8 is automatically controlled, for example, in a range between 0 and −50 dB.

For selection and output of the FM signal, operation mode of the combination tuner differs depending upon when the reception field intensity of the FM signal is relatively large, for example, exceeds 90 dB$\mu$, and when the reception field intensity is relatively small, for example, less than 90 dB$\mu$. The former case takes the second mode, and the latter case takes the third mode.

In the second mode where the reception field intensity of the FM signal exceeds 90 dB$\mu$, the codes in the second mode are applied to the pair of band data supply terminals $18_1$ and $18_2$, namely, code 0 and code 1 are applied to the terminals $18_1$ and $18_2$, respectively. The two codes 0 and 1 are then forwarded to the switching circuit 15. When the switching circuit 15 receives the two codes 0 and 1, the transistor $15_1$ of emitter-follower connected type is turned on and the transistor $15_2$ of emitter-follower connected type is turned off, and the transistor $15_3$ is turned on since the transistor $15_1$ is turned on. Then, both outputs of the switching circuit 15 become power supply voltages. The power supply voltages output from the switching circuit 15 are applied to the second signal selection stage 6, and to the control inputs of the FM trap 7, the intermediate frequency bandwidth switching stage 12, and the gain setting stage 14.

Once the second signal selection stage 6 has received the power supply voltage, the transistor $6_1$ is turned on. Since the transistor $6_1$ is turned on, the diodes $6_2$ and $6_3$, whose cathode and anode are supplied with a ground voltage and a positive voltage, are forward biased. Then, the diodes $6_2$ and $6_3$ are turned on. At the same time, the diode $6_4$, whose cathode and anode are supplied with a positive voltage and a ground voltage, respectively, is reverse biased. Therefore, the FM signal supplied to the input of the second signal selection stage 6 is transmitted to the output via the diodes $6_2$ and $6_3$ which are turned on, followed by the FM trap 7.

In the first signal selection stage 5, since the transistor $6_1$ is turned on, the diodes $5_1$ and $5_2$, whose anode and cathode are supplied with a ground voltage and a positive voltage, respectively, are reverse biased. Then, the diodes $5_1$ and $5_2$ are turned off. Therefore, the television signal and the FM signal which are passed to the input of the first signal selection stage 5 are blocked by the diodes $5_1$ and $5_2$ which are turned off, and are not transmitted to the output.

Upon receipt of the power supply voltage at the control input, the FM trap 7 deactivates an FM trap for trapping an FM frequency band signal. Upon receipt of the power supply voltage at the control input, the intermediate frequency band switching stage 12 switches the intermediate frequency band to 1.2 MHz which is the intermediate frequency band of the FM signal. Upon receipt of the power supply voltage at the control input, the gain setting stage 14 sets a small signal gain for the gain setting stage 14.

Since the second mode is generated when an FM signal is selected and output, the maximum gain set voltage, e.g., 4 V, is applied to the automatic gain control voltage supply terminal 17, so that the radio-frequency amplifier stage 8 is controlled so as to be maximized, e.g., at 0 dB.

At this time, the FM signal output from the second signal selection stage 6 is not trapped by the FM trap 7, and is amplified at the maximum gain by the radio-frequency amplifier stage 8. The resulting signal is passed to the radio-frequency tuner stage 9, where a required frequency signal is selected, and is then mixed with the local oscillation signal output from the local oscillator 11 by the frequency mixer stage 10 for conversion into an intermediate frequency signal. In the mixed output from the frequency mixer stage 10, an intermediate frequency signal of 1.2 MHz is selected by the intermediate frequency bandwidth switching stage 12, and the resulting intermediate frequency signal is amplified to a predetermined level by the intermediate frequency amplifier stage 13. The signal is further amplified at a small signal gain by the gain setting stage 14, and is forwarded to the intermediate frequency signal output terminal 16.

In the third mode where the reception field intensity of the FM signal is less than 90 dBμ, the codes in the third mode are applied to the pair of band data supply terminals $18_1$ and $18_2$, namely, code 1 and code 1 are applied to the terminals $18_1$ and $18_2$, respectively. The two codes 1 and 1 are then forwarded to the switching circuit 15. When the switching circuit 15 receives the two codes 1 and 1, the transistor $15_1$ of emitter-follower connected type and the transistor $15_2$ of emitter-follower connected type are simultaneously turned on, and the transistor $15_3$ is turned off since the transistors $15_1$ and $15_2$ are turned on. One of the two outputs of the switching circuit 15 which is supplied to the second signal selection stage 6 becomes a ground voltage. The other output which is supplied to the control inputs of the FM trap 7, the intermediate frequency bandwidth switching stage 12, and the gain setting stage 14 becomes a power supply voltage.

Once the second signal selection stage 6 has received the ground voltage, as in the first mode, the diodes $6_2$ and $6_3$ are turned off, and the diode $6_4$ is turned on. Therefore, the FM signal supplied to the input of the second signal selection stage 6 is blocked by the diodes $6_2$ and $6_3$ which are turned off, and is not transmitted to the output.

In the first signal selection stage 5, as in the first mode, the diodes $5_1$ and $5_2$ are turned on, and the diode $5_3$ is turned off. Therefore, the television signal and the FM signal which are passed to the input of the first signal selection stage 5 are transmitted to the output via the diodes $5_1$ and $5_2$ which are turned on, followed by the FM trap 7.

Upon receipt of the power supply voltage at the control input, the FM trap 7 deactivates an FM trap for trapping an FM frequency band signal. Upon receipt of the power supply voltage at the control input, the intermediate frequency band switching stage 12 switches the intermediate frequency band to 1.2 MHz which is the intermediate frequency band of the FM signal. Upon receipt of the power supply voltage at the control input, the gain setting stage 14 sets a small signal gain for the gain setting stage 14.

Since the third mode is generated when an FM signal is selected and output, the maximum gain set voltage, e.g., 4 V, is applied to the automatic gain control voltage supply terminal 17, so that the gain of the radio-frequency amplifier stage 8 is controlled so as to be maximized, e.g., at 0 dB.

When the television signal and FM signal which are output from the first signal selection stage 5 are forwarded to the FM trap 7, the FM trap 7 is inactive. Thus, the FM signal is further transmitted, and the television signal is only attenuated. The FM signal is then amplified at the maximum gain by the radio-frequency amplifier stage 8. The resulting signal is passed to the radio-frequency tuner stage 9, where a required frequency signal is selected, and is then mixed with the local oscillation signal output from the local oscillator 11 by the frequency mixer stage 10 for conversion into an intermediate frequency signal. In the mixed output from the frequency mixer stage 10, an intermediate frequency signal of 1.2 MHz is selected by the intermediate frequency switching stage 12, and the resulting intermediate frequency signal is amplified to a predetermined level by the intermediate frequency amplifier stage 13. The signal is further amplified at a small signal gain by the gain setting stage 14, and is forwarded to the intermediate frequency signal output terminal 16.

In the combination tuner according to the first embodiment, therefore, a data signal which is used to set operation mode of the combination tuner at any one of the first to third modes is passed to the band data supply terminal $18_1$ and $18_2$, such that the television signal is selected and output in the first mode, the FM signal having a high reception field intensity is selected and output using a low sensitivity antenna in the second mode, and the FM signal having a low reception field intensity is selected and output using a high sensitivity antenna in the third mode. Therefore, if the target FM signal has a low reception field intensity, the level of the received FM signal is not extremely lowered, and the FM signal can be always reproduced successfully.

Figure 2:
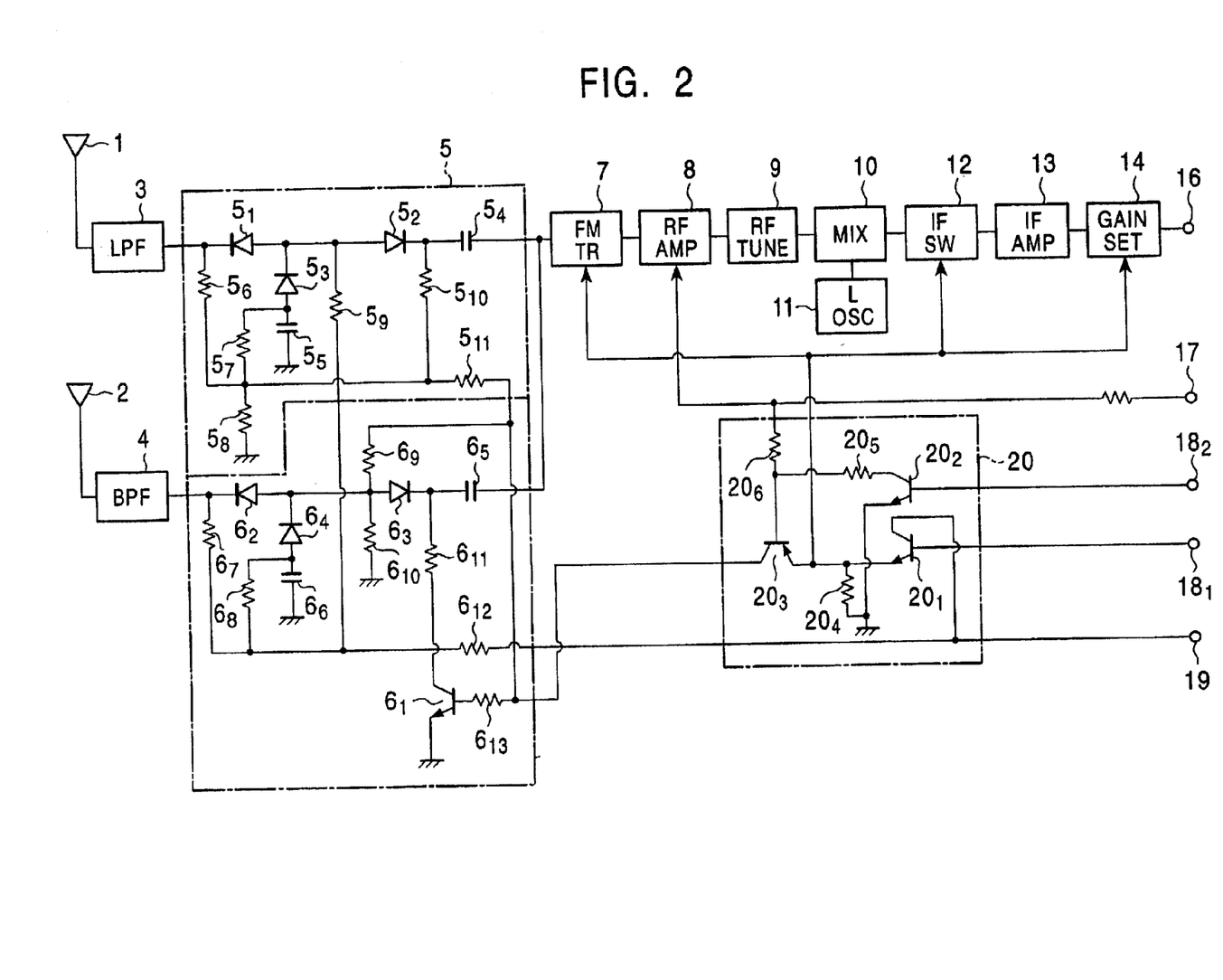
FIG. 2 is a circuit diagram of a combination tuner according to a second embodiment of the present invention, partially showing the main components in blocks.

FIG. 2 is a circuit diagram of a combination tuner according to a second embodiment of the present invention, partially showing the main components in blocks.

As shown in FIG. 2, a switching circuit 20 according to the second embodiment has a different structure as that of the switching circuit 15 according to the first embodiment. In addition, the codes in the second and third modes which are applied to the pair of the band data supply terminals $18_1$ and $18_2$ differ from those in the first embodiment. Other components are the same as those in the first embodiment. In FIG. 2, the same reference numerals are given to the same components as those shown in FIG. 1.

The switching circuit 20 in the second embodiment includes three transistors $20_1$, $20_2$, and $20_3$, and three resistors $20_4$, $20_5$, and $20_6$. These circuit components are connected in such a way as shown in FIG. 2.

In the second embodiment, code 1 and code 1 are applied to the terminal $18_1$ and $18_2$, respectively, in the second mode, and code 1 and code 0 are applied to the terminal $18_1$ and $18_2$, respectively, in the third mode.

The operation of the thus constructed combination tuner according to the second embodiment is now described. It is noted that the operation in the first mode according to the second embodiment is the same as the operation in the first mode according to the first embodiment, and an overlapping description of the first mode in the second embodiment is thus omitted.

In the second mode where the reception field intensity of the FM signal exceeds 90 dBpµ, the codes in the second mode are applied to the pair of band data supply terminals $18_1$ and $18_2$, namely, code 1 and code 1 are applied to the terminals $18_1$ and $18_2$, respectively. The two codes 1 and 1 are then forwarded to the switching circuit 20. When the switching circuit 20 receives the two codes 1 and 1, the transistor $20_1$ of emitter-follower connected type and the common-emitter transistor $20_2$ are simultaneously turned on. The transistor $20_1$ which is turned on allows a power supply voltage to be applied to the emitter of the transistor $20_3$, and the transistor $20_2$ which is turned on allows a gain control voltage which is divided by the resistors $20_5$ and $20_6$ to be applied to the base of the transistor $20_3$. Then, the transistor $20_3$ is turned on. One of the two outputs of the switching circuit 20 which is supplied to the second signal selection stage 6 becomes a power supply voltage, and the other output which is supplied to the control inputs of the FM trap 7, the intermediate frequency bandwidth switching stage 12, and the gain setting stage 14 becomes a power supply voltage.

Once the second signal selection stage 6 has received the power supply voltage, as described above, the diodes $6_2$ and $6_3$ are turned on, and the diode $6_4$ is turned off. Therefore, the FM signal supplied to the input of the second signal selection stage 6 is transmitted to the output via the diodes $6_2$ and $6_3$ which are turned on, followed by the FM trap 7.

In the first signal selection stage 5, as described above, the diodes $5_1$ and $5_2$ are turned off, and the diode $5_3$ is turned on. Therefore, the television signal and the FM signal which are passed to the input of the first signal selection stage 5 are blocked by the diodes $5_1$ and $5_2$ which are turned off, and are not transmitted to the output.

Upon receipt of the power supply voltage at the control input, the FM trap 7 deactivates an FM trap for trapping an FM frequency band signal. Upon receipt of the power supply voltage at the control input, the intermediate frequency band switching stage 12 switches the intermediate frequency band to 1.2 MHz which is the intermediate frequency band of the FM signal. Upon receipt of the power supply voltage at the control input, the gain setting stage 14 sets a small signal gain for the gain setting stage 14.

Since the second mode is generated when an FM signal is selected and output, the maximum gain set voltage, e.g., 4 V, is applied to the automatic gain control voltage supply terminal 17. However, the transistor $20_2$ which is turned on allows the maximum gain set voltage to be divided by a resistor (not numbered) connected to the automatic gain control voltage supply terminal 17 and by the two resistors $20_6$ and $20_5$. A divided voltage, e.g., 2.5 V, is applied to the control input of the radio-frequency amplifier stage 8, of which the gain is controlled at a lower gain than the maximum gain, for example, at −10 dB which is about 10 dB lower than 0 dB.

At this time, the FM signal output from the second signal selection stage 6 is not trapped by the FM trap 7, and is amplified at a lower gain than the maximum gain by the radio-frequency amplifier stage 8. The resulting signal is passed to the radio-frequency tuner stage 9, where a required frequency signal is selected, and is then mixed with the local oscillation signal output from the local oscillator 11 by the frequency mixer stage 10 for conversion into an intermediate frequency signal. In the mixed output from the frequency mixer stage 10, an intermediate frequency signal of 1.2 MHz is selected by the intermediate frequency bandwidth switching stage 12, and the resulting intermediate frequency signal is amplified to a predetermined level by the intermediate frequency amplifier stage 13. The signal is further amplified at a small signal gain by the gain setting stage 14, and is forwarded to the intermediate frequency signal output terminal 16.

In the third mode where the reception field intensity of the FM signal is less than 90 dBµ, the codes in the third mode are applied to the pair of band data supply terminals $18_1$ and $18_2$, namely, code 1 and code 0 are applied to the terminals $18_1$ and $18_2$, respectively. The two codes 1 and 0 are then forwarded to the switching circuit 20. When the switching circuit 20 receives the two codes 1 and 0, the transistor $20_1$ of emitter-follower connected type is turned on and the common-emitter transistor $20_2$ is turned off, and the transistor $20_3$ is also turned on since the transistors $20_2$ is turned off. One of the two outputs of the switching circuit 20 which is supplied to the second signal selection stage 6 becomes a ground voltage. The other output which is supplied to the control inputs of the FM trap 7, the intermediate frequency band switching stage 12, and the gain set stage 14 becomes a power supply voltage.

Once the second signal selection stage 6 has received the ground supply voltage, as described above, the diodes $6_2$ and $6_3$ are turned off, and the diode $6_4$ is turned on. Therefore, the FM signal supplied to the input of the second signal selection stage 6 is blocked by the diodes $6_2$ and $6_3$ which are turned off, and is not transmitted to the output.

In the first signal selection stage 5, as described above, the diodes $5_1$ and $5_2$ are turned on, and the diode $5_3$ is turned off. Therefore, the television signal and the FM signal which are passed to the input of the first signal selection stage 5 are transmitted to the output via the diodes $5_1$ and $5_2$ which are turned on, followed by the FM trap 7.

Upon receipt of the power supply voltage at the control input, the FM trap 7 deactivates an FM trap for trapping an FM frequency band signal. Upon receipt of the power supply voltage at the control input, the intermediate frequency band switching stage 12 switches the intermediate frequency band to 1.2 MHz which is the intermediate frequency band of the FM signal. Upon receipt of the power supply voltage at the control input, the gain setting stage 14 sets a small signal gain for the gain setting stage 14.

Since the third mode is generated when an FM signal is selected and output, the maximum gain set voltage, e.g., 4 V, is applied to the automatic gain control voltage supply terminal 17, so that the gain of the radio-frequency amplifier stage 8 is controlled so as to be maximized, e.g., 0 dB.

When the television signal and FM signal which are output from the first signal selection stage 5 are forwarded to the FM trap 7, the FM trap 7 is inactive. Thus, the FM signal is further transmitted, and the television signal is only attenuated. The FM signal is then amplified at the maximum gain by the radio-frequency amplifier stage 8. The resulting signal is passed to the radio-frequency tuner stage 9, where a required frequency signal is selected, and is then mixed with the local oscillation signal output from the local oscillator 11 by the frequency mixer stage 10 for conversion into an intermediate frequency signal. In the mixed output from the frequency mixer stage 10, an intermediate frequency signal of 1.2 MHz is selected by the intermediate frequency switching stage 12, and the resulting intermediate frequency signal is amplified to a predetermined level by the intermediate frequency amplifier stage 13. The signal is further amplified with a small signal gain by the gain setting stage 14, and is forwarded to the intermediate frequency signal output terminal 16.

In the combination tuner according to the second embodiment, therefore, a data signal which is used to set operation mode of the combination tuner at any one of the first to third modes is passed to the band data supply terminal 18$_1$ and 18$_2$, such that the television signal is selected and output in the first mode, the FM signal having a high reception field intensity, in which the gain of the radio-frequency amplifier stage 8 is slightly lowered, is selected and output using a low sensitivity antenna in the second mode, and the FM signal having a low reception field intensity is selected and output using a high sensitivity antenna in the third mode. Therefore, if the target FM signal has a low reception field intensity, the level of the received FM signal is not extremely lowered, and the FM signal can be always reproduced successfully.

Although the first or second embodiment has been described using the switching circuit 15 or 20 including three transistors 15$_1$ to 15$_3$ or 20$_1$ to 20$_3$, the switching circuit according to the present invention is not limited thereto. Of course, any other circuitry which achieves the same features achieved by the switching circuit 15 or 20 may be used.

What is claimed is:

1. A combination tuner comprising:
    a first signal receiving unit to receive a television signal and an FM signal using an externally connected antenna;
    a second signal receiving unit to receive an FM signal using an internal antenna;
    a signal selecting unit to select reception signals of said first signal receiving unit and a reception signal of said second signal receiving unit;
    a radio-frequency selecting and amplifying unit to select and amplify the resulting reception signal;
    a frequency converting unit to convert the amplified radio-frequency signal into an intermediate frequency signal;
    an intermediate frequency selecting and amplifying unit to select and amplify the intermediate frequency signal; and
    a switching circuit to switch selection of the television signal or the FM signal according to three-mode band data,
    wherein said switching circuit includes three transistors which are selectively turned on and off so that one of the television signal from said first signal receiving unit, the FM signal from said second signal receiving unit, and the FM signal from said first signal receiving unit is selected according to the mode of the band data,
    said switching circuit includes a first transistor whose base is supplied with the band data, the first transistor being an emitter-follower, a second transistor whose base is supplied with the band data, the second transistor being an emitter-follower, and a third transistor whose base and emitter are supplied with an output of the first transistor and an output of the second transistor, respectively.

2. A combination tuner comprising:
    a first signal receiving unit to receive a television signal and an FM signal using an externally connected antenna;
    a second signal receiving unit to receive an FM signal using an internal antenna;
    a signal selecting unit to select reception signals of said first signal receiving unit and a reception signal of said second signal receiving unit;
    a radio-frequency selecting and amplifying unit to select and amplify the resulting reception signal;
    a frequency converting unit to convert the amplified radio-frequency signal into an intermediate frequency signal;
    an intermediate frequency selecting and amplifying unit to select and amplify the intermediate frequency signal; and
    a switching circuit to switch selection of the television signal or the FM signal according to three-mode band data,
    wherein said switching circuit includes three transistors which are selectively turned on and off such that one of the television signal from said first signal receiving unit, the FM signal from said second signal receiving unit, and the FM signal from said first signal receiving unit is selected according to the mode of the band data, and such that an automatic gain control voltage which is supplied to said radio-frequency selecting and amplifying unit is attenuated when the FM signal from said second signal receiving unit is selected,
    said switching circuit includes a first transistor whose base is supplied with the band data, the first transistor being an emitter-follower, a second common-emitter transistor whose base is supplied with the band data and whose collector is supplied with the automatic gain control voltage via a resistor divider, and a third transistor whose base is supplied with a divided voltage of the automatic gain control voltage and whose emitter is supplied with an output of the first transistor.

3. A combination tuner according to claim 1, wherein said radio-frequency selecting and amplifying unit includes an FM trap circuit, and the intermediate frequency selecting and amplifying unit includes an intermediate frequency bandwidth switching circuit and a gain setting circuit, in which:
    when a television signal is selected, the FM trap circuit is active, the intermediate frequency bandwidth switching circuit is set at the intermediate frequency bandwidth of the television signal, and the gain setting circuit is set at a large gain; and
    when an FM signal is selected, the FM trap circuit is inactive, the intermediate frequency bandwidth switching circuit is set at the intermediate frequency bandwidth of the FM signal, and the gain setting circuit is set at a low gain.

4. A combination tuner according to claim 2, wherein said radio-frequency selecting and amplifying unit includes an FM trap circuit, and the intermediate frequency selecting and amplifying unit includes an intermediate frequency bandwidth switching circuit and a gain setting circuit, in which:
    when a television signal is selected, the FM trap circuit is active, the intermediate frequency bandwidth switching circuit is set at the intermediate frequency bandwidth of the television signal, and the gain setting circuit is set at a large gain; and
    when an FM signal is selected, the FM trap circuit is inactive, the intermediate frequency bandwidth switching circuit is set at the intermediate frequency bandwidth of the FM signal, and the gain setting circuit is set at a low gain.

* * * * *